H. FRANK.
Catch-Basins.
No. 8,226. Reissued May 14, 1878.
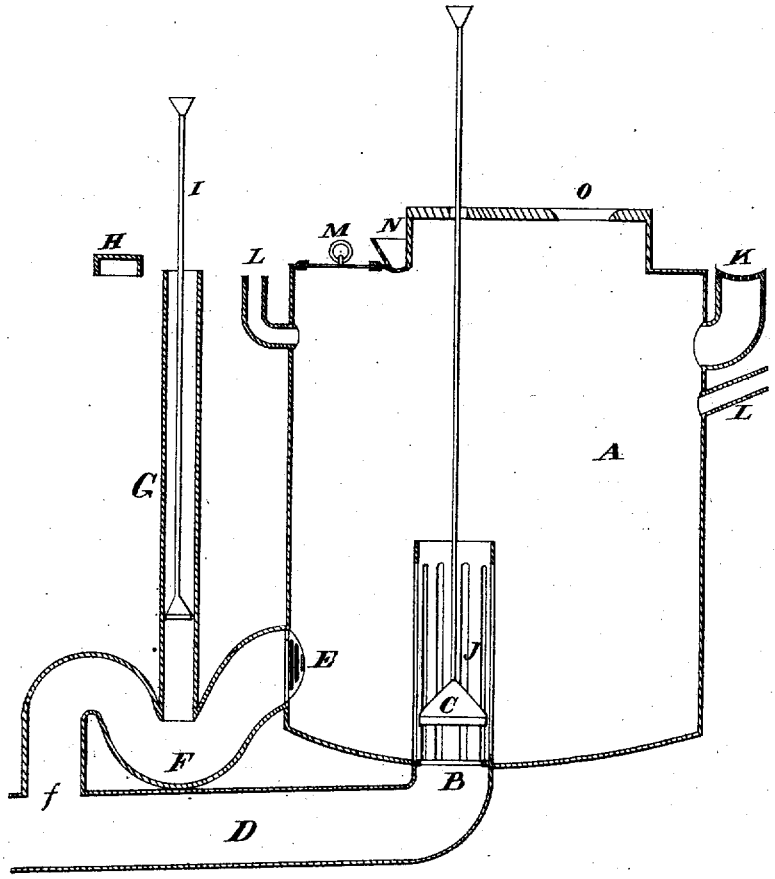
Attest:
Jno. W. Grehle
W. S. Christopher
Inventor:
Henry Frank, per
Wm. Hubbell Fisher,
Atty.
N. PETERS, PHOTO-LITHOGRAPHER, WASHINGTON, D. C.

UNITED STATES PATENT OFFICE.

HENRY FRANK, OF CINCINNATI, OHIO.

IMPROVEMENT IN CATCH-BASINS.

Specification forming part of Letters Patent No. 181,931, dated September 5, 1876; Reissue No. 8,226, dated May 14, 1878; application filed April 26, 1878.

*To all whom it may concern:*

Be it known that I, HENRY FRANK, of the city of Cincinnati, county of Hamilton, and State of Ohio, have invented certain new and useful Improvements in Catch-Basins, of which the following is a specification:

I have selected, to illustrate my improvements, a catch-basin adapted for use in conjunction with a water-closet, provisions also being shown for the discharge into it of the various household and gutter pipes.

My invention consists, first, of a peculiar arrangement of a water-trap and a main discharge-pipe, and a device for stopping the ascent of mephitic gas, in combination with a catch-basin; and, secondly, of the water-trap and discharge-pipe, provided with means whereby the trap may be cleared of sediment.

The accompanying drawing is a vertical section of a catch-basin proper and its appurtenances embodying my improvements.

A represents the basin proper. B represents an opening in the basin-floor, by which, whenever the plunger C is lifted, the contents escape into the discharge-pipe D. J is a cage or grated stand-pipe, which, besides performing its principal function of a strainer, is so arranged as to be a guide for the plunger C.

Grated opening E communicates with the escape-pipe F, which latter empties into the discharge-pipe D at *f*, or into an adjacent sewer or other convenient place. Escape-pipe F is provided with a trap between opening *f* and opening E, as shown in the drawing. A tube, G, which rises from the elbow of escape-pipe F, is ordinarily closed by cap H, but is capable of receiving a plunger, I, by means of which any sediment that may collect in the lowest part of the trap may be removed.

K shows a common gutter sink or grating. L, are house-pipes; M, man-hole; N, urinal; O, seat.

It is manifest that the catch-basin may at any moment be completely emptied by elevation of the plunger C, whose closure at all other times prevents the ascent of any mephitic gases.

Should the basin after night or during a storm, for example, become flooded, its contents escape automatically by the trap F.

The above members may be of any suitable materials. I use, however, and recommend for the basin proper brick-work lined with hydraulic cement; for the top portions, oak or other suitable wood; and for the various pipes, spouts, and gratings, galvanized iron.

What I claim as new, and desire to secure by Letters Patent, is—

1. The combination of a catch-basin and discharge-pipe, as D, and escape-pipe, having a trap between its inlet and exit orifices.

2. The combination of a catch-basin and discharge-pipe, as D, and escape-pipe having a trap between the basin and the main discharge-pipe, with which it communicates.

3. The main discharge-pipe D and escape-pipe F, in the described combination with a catch-basin, A, stand-pipes J and G, and plungers C and I, for the purposes set forth.

4. The pipe G extending upward from the middle of the trap in pipe F, and provided with suitable plunger I, for the purpose explained.

5. In combination with a catch-basin, the delivery-pipe D, provided with plunger C, and an escape-pipe having a trap between its inlet and exit orifices, substantially as and for the purposes set forth.

HENRY FRANK.

Attest:
C. WALTON, Jr.,
W. S. CHRISTOPHER.